United States Patent
Yu et al.

(10) Patent No.: US 12,011,406 B2
(45) Date of Patent: Jun. 18, 2024

(54) WEARABLE MULTIFUNCTIONAL POWERED EXOSKELETON FOR CERVICAL VERTEBRA REHABILITATION

(71) Applicant: UNIVERSITY OF SHANGHAI FOR SCIENCE AND TECHNOLOGY, Shanghai (CN)

(72) Inventors: Hongliu Yu, Shanghai (CN); Yue Dai, Shanghai (CN); Ping Shi, Shanghai (CN); Wei Jiang, Shanghai (CN); Hongyu Zheng, Shanghai (CN); Chen He, Shanghai (CN); Qiaoling Meng, Shanghai (CN)

(73) Assignee: University of Shanghai for Science and Technology, Shanghai (CN)

( * ) Notice: Subject to any disclaimer, the term of this patent is extended or adjusted under 35 U.S.C. 154(b) by 689 days.

(21) Appl. No.: 17/259,237

(22) PCT Filed: Dec. 11, 2020

(86) PCT No.: PCT/CN2020/135632
§ 371 (c)(1),
(2) Date: Jan. 11, 2021

(87) PCT Pub. No.: WO2022/077752
PCT Pub. Date: Apr. 21, 2022

(65) Prior Publication Data
US 2022/0354728 A1     Nov. 10, 2022

(30) Foreign Application Priority Data
Oct. 13, 2020   (CN) .......................... 202011089493.2

(51) Int. Cl.
*A61H 1/02*     (2006.01)
*B25J 9/00*     (2006.01)

(52) U.S. Cl.
CPC .......... *A61H 1/0296* (2013.01); *B25J 9/0006* (2013.01); *A61H 2201/1207* (2013.01);
(Continued)

(58) Field of Classification Search
CPC .......... A61H 1/0296; A61H 2201/1207; A61H 2201/1607; A61H 2201/1616;
(Continued)

(56) References Cited

U.S. PATENT DOCUMENTS

| | | | |
|---|---|---|---|
| 10,420,695 B2 * | 9/2019 | Lee | ....... A61H 1/0281 |
| 2009/0137934 A1 * | 5/2009 | Seon | ....... A61F 5/0123 602/19 |
| 2013/0331744 A1 * | 12/2013 | Kamon | ....... A61H 1/0266 601/35 |

FOREIGN PATENT DOCUMENTS

| | | |
|---|---|---|
| CN | 104983544 A | 10/2015 |
| CN | 106955219 A | 7/2017 |

(Continued)

OTHER PUBLICATIONS

EP-3280374-B1; Gayral et al., Jan. 2020 (Year: 2020).*
(Continued)

*Primary Examiner* — Justine R Yu
*Assistant Examiner* — Matthew D Ziegler
(74) *Attorney, Agent, or Firm* — Zhu Lehnhoff LLP

(57) ABSTRACT

A wearable multifunctional powered exoskeleton for cervical vertebra rehabilitation, and relates to the field of man-machine interaction rehabilitation aids, comprises an active drive motor module, a fixed supporting module and a movable joint component; wherein the active drive motor module is connected to the fixed supporting module, and comprises a left shoulder push rod motor, a right shoulder push rod motor, a cervico-thoracic vertebra left front side push rod motor, a cervico-thoracic vertebra left rear side
(Continued)

push rod motor, a cervico-thoracic vertebra right front side push rod motor, and a cervico-thoracic vertebra right rear side push rod motor; wherein the active drive motor module and the movable joint component are combined to Jointly form a six-connecting rod power-driven structure.

3 Claims, 4 Drawing Sheets

(52) U.S. Cl.
CPC ........... *A61H 2201/1607* (2013.01); *A61H 2201/1616* (2013.01); *A61H 2201/1652* (2013.01); *A61H 2201/1661* (2013.01)

(58) Field of Classification Search
CPC .... A61H 2201/1652; A61H 2201/1661; A61H 2001/0207; A61H 2201/0107; A61H 2201/123; A61H 2201/1611; A61H 2201/165; A61H 2201/1676; A61H 2201/5071; A61H 1/0218; A61H 2201/1238; A61H 2201/1246; A61H 2201/1609; A61H 1/02; A61H 1/0292; B25J 9/0006; A61F 5/042

See application file for complete search history.

(56) References Cited

FOREIGN PATENT DOCUMENTS

| | | |
|---|---|---|
| CN | 111228086 A | 6/2020 |
| CN | 112043482 A | 12/2020 |
| KR | 102159449 B1 | 9/2020 |

OTHER PUBLICATIONS

KR-20170061778-A; Park Jae, Jun. 2017 (Year: 2017).*
CN-104983544-A; Yang C, Oct. 2015 (Year: 2015).*
International Search Report in PCT/CN2020/135632, issued by ISA, dated Jun. 25, 2021.
Written Opinion of the International Search Report in PCT/CN2020/135632, issued by ISA, dated Jun. 25, 2021.

* cited by examiner

WEARABLE MULTIFUNCTIONAL POWERED EXOSKELETON FOR CERVICAL VERTEBRA REHABILITATION

TECHNICAL FIELD

The invention relates to the field of man-machine interaction rehabilitation aids, in particular a wearable multifunctional powered exoskeleton for cervical vertebra rehabilitation.

BACKGROUND

The neck has most complicated human body geometrical characteristics and kinetic characteristics and is one of the most vulnerable parts. With the changes in people's living habits and work styles, the incidence of cervical vertebra diseases has increased year by year. At the same time, with the continuous research and development of parallel mechanisms, control technologies, man-machine interaction and the like, cervical vertebra exoskeletons have gradually become a research hotspot in the field of rehabilitation.

Most of the existing exoskeletons for cervical vertebra rehabilitation are of supporting fixation or traction single rehabilitation training. There are two types of exoskeletons for cervical vertebra rehabilitation. One type of exoskeleton for cervical vertebra rehabilitation is in rigid contact with the cervical vertebra, but the cervical vertebra cannot be adaptively adjusted due to the rigid support and is easily damaged; as supporting points of the cervical vertebra cannot be tightly fit to the cervical vertebra, the condition that the supporting is not in place may be caused; and the lack of sufficient tension for stability and longitudinal tension of the cervical vertebra and other problems affect the protection and treatment of the cervical vertebra. Another type of exoskeletons are inflatable; the supporting curative effects of the inflatable exoskeletons on the cervical vertebra cannot be accurately controlled; and the inflatable exoskeletons have few rehabilitation functions.

With the development of man-machine interaction technologies and rehabilitation medicine, in order to improve the existing cervical vertebra training aids, those skilled in the art are committed to developing a wearable multifunctional powered exoskeleton for cervical vertebra rehabilitation, which has both cervical vertebra enhancement and rehabilitation training functions, can realize neck traction exercise training within the range of full joint motion, and enhances the stability of the cervical vertebra through directional resistance training and multi-directional muscle force training of neck muscles.

SUMMARY OF THE INVENTION

In view of the above-mentioned shortcomings of the prior art, the technical problem to be solved by the invention is: how to realize cervical vertebra enhancement and rehabilitation training functions, and enhance the stability of the cervical vertebra.

In order to realize the above-mentioned purposes, the wearable multifunctional powered exoskeleton for cervical vertebra rehabilitation comprises an active drive motor module, a fixed supporting module and a movable joint component; the active drive motor module is connected to the fixed supporting module, and comprises a left shoulder push rod motor, a right shoulder push rod motor, a cervico-thoracic vertebra left front side push rod motor, a cervico-thoracic vertebra left rear side push rod motor, a cervico-thoracic vertebra right front side push rod motor, and a cervico-thoracic vertebra right rear side push rod motor; and the active drive motor module and the movable joint component are combined to jointly form a six-connecting rod power-driven structure.

Further, the fixed supporting module comprises a lower jaw supporting component, an occipital bone supporting component, a rear side cervical vertebra supporting part, a cervico-thoracic vertebra front side supporting sheet and a cervico-thoracic vertebra rear side supporting sheet.

Further, the movable joint component comprises universal joints and spherical joint rotating hinges.

Further, the upper ends of the cervico-thoracic vertebra left front side push rod motor, the cervico-thoracic vertebra left rear side push rod motor, the cervico-thoracic vertebra right front side push rod motor, and the cervico-thoracic vertebra right rear side push rod motor are in threaded connection with the lower jaw supporting component or the occipital bone supporting component through the universal joints; the lower ends of the cervico-thoracic vertebra left front side push rod motor, the cervico-thoracic vertebra left rear side push rod motor, the cervico-thoracic vertebra right front side push rod motor, and the cervico-thoracic vertebra right rear side push rod motor are in threaded connection with the cervico-thoracic vertebra front side supporting sheet or the cervico-thoracic vertebra rear side supporting sheet through the spherical joint rotating hinges; the upper ends of the left shoulder push rod motor and the right shoulder push rod motor are in threaded connection with the lower jaw supporting component through the universal joints; and the lower ends of the left shoulder push rod motor and the right shoulder push rod motor are in threaded connection with the cervico-thoracic vertebra rear side supporting sheet through the universal joints.

Further, the occipital bone supporting component is in threaded connection with the rear side cervical vertebra supporting part; and when the antiflexion and retroextension, lateral flexion and horizontal rotation rehabilitation exercises of the cervical vertebra are performed, the rear side cervical vertebra supporting part is dismantled, and an angle transducer is arranged at the middle position of the occipital bone supporting component.

Further, the wearable multifunctional powered exoskeleton is also provided with pressure sensors; the pressure sensors are connected to the push rod motors through threaded connectors; and the other ends of the threaded connectors are connected to the universal joints.

Further, the universal joints are connected to the fixed supporting module through shaft sleeves; and the spherical joint rotating hinge is connected to the cervico-thoracic vertebra front side supporting sheet or the cervico-thoracic vertebra rear side supporting sheet through the shaft sleeve.

Further, the cervico-thoracic vertebra front side supporting sheet is connected to a lumbar vertebra front side supporting sheet through a front side supporting bar; the cervico-thoracic vertebra rear side supporting sheet is connected to a lumbar vertebra rear side supporting sheet through a rear side supporting bar; and the lengths of the front side supporting bar and the rear side supporting bar can be adjusted in the height direction.

Further, the lower jaw supporting component and the occipital bone supporting component are connected through a neck collar connecting band and a first hook-and-loop; and the cervico-thoracic vertebra front side supporting sheet and the cervico-thoracic vertebra rear side supporting sheet are connected through shoulder connecting bands and second hook-and-loops.

Further, supporting bars are also arranged at the axilla positions of the cervico-thoracic vertebra front side supporting sheet and the cervico-thoracic vertebra rear side supporting sheet; the lengths of the supporting bars can be adjusted; the supporting bar comprises a fixing band and a third hook-and-loop; and the lumbar vertebra front side supporting sheet and the lumbar vertebra rear side supporting sheet are connected through a lumbar vertebra connecting band and a fourth hook-and-loop.

Compared with the prior art, the wearable multifunctional powered exoskeleton for cervical vertebra rehabilitation has the following beneficial technical effects:

1. The power is obtained through the linear push rod motors to realize multifunctional traction and resistance training of the cervical vertebra. The traction training of the neck in the whole joint range is realized, and the muscle force of the neck is effectively enhanced.
2. Through the mutual cooperation of the push rod motors, the universal joints and the spherical joint rotating hinges, the directional resistance training of the neck muscles can be realized, and the stability of the cervical vertebra can be enhanced.
3. The rehabilitation training of the neck is controlled and evaluated in real time through the angle transducer and the pressure sensors.
4. The wearable multifunctional powered exoskeleton for cervical vertebra rehabilitation has certain flexibility, and therefore, the wearable multifunctional powered exoskeleton for cervical vertebra rehabilitation has more ideal man-machine coupling characteristics, adapts to the multifunctional rehabilitation curative effect of the cervical vertebra, and has a promoting effect on the health of the user's cervical vertebra.
5. The wearable multifunctional powered exoskeleton for cervical vertebra rehabilitation has a lightweight structure and is easy to assemble and process.

Hereinafter, the concept, specific structure and technical effects of the wearable multifunctional powered exoskeleton for cervical vertebra rehabilitation will be further described with reference to the drawings so as to fully understand the purpose, characteristics and effects of the wearable multifunctional powered exoskeleton for cervical vertebra rehabilitation.

Figure 1:
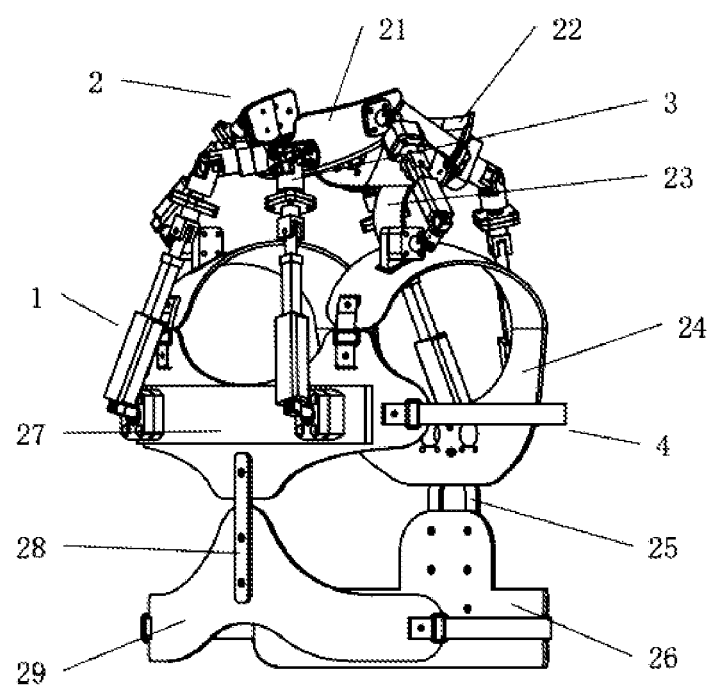
FIG. 1 is a structure diagram of a vertical traction rehabilitation exercise of a powered exoskeleton of the invention.
Figure 2:
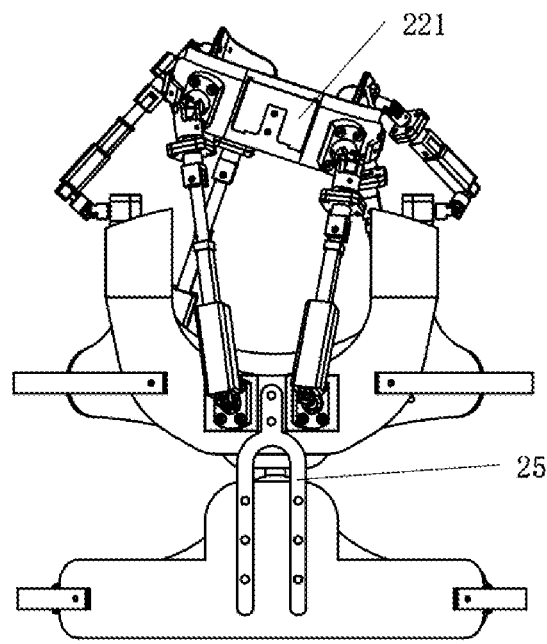
FIG. 2 is a structure diagram of a lateral bending rehabilitation exercise of the powered exoskeleton of the invention.
Figure 3:
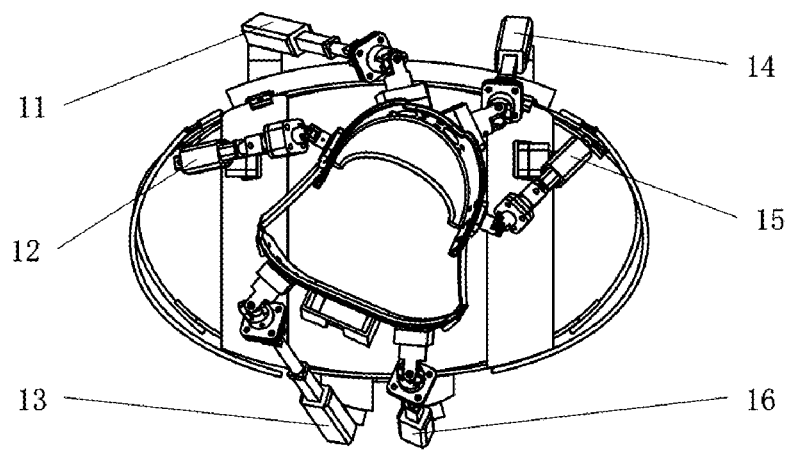
FIG. 3 is a structure diagram of a horizontal rotation rehabilitation exercise of the powered exoskeleton of the invention.
Figure 4:
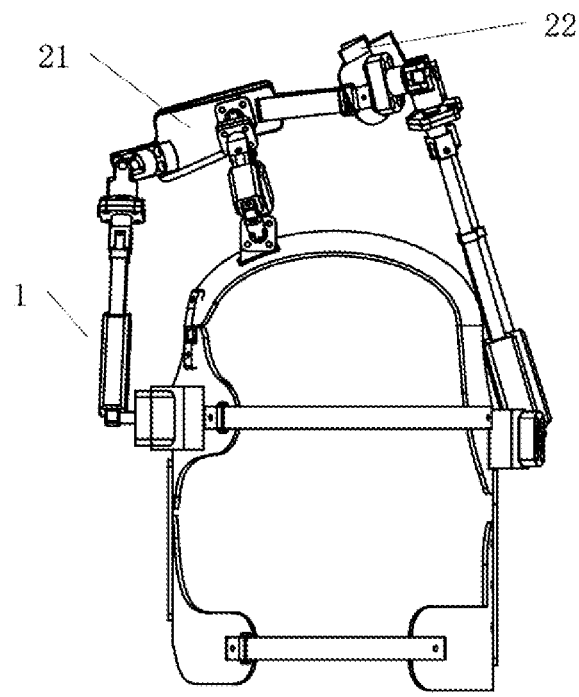
FIG. 4 is a structure diagram of an anteflexion rehabilitation exercise of the powered exoskeleton of the invention.

Thereinto, 1 active drive motor module; 2 fixed supporting module; 3 movable joint component; 4 supporting bar; 11 cervico-thoracic vertebra left front side push rod motor; 12 left shoulder push rod motor; 13 cervico-thoracic vertebra left rear side push rod motor; 14 cervico-thoracic vertebra right front side push rod motor; 15 right shoulder push rod motor; 16 cervico-thoracic vertebra right rear side push rod motor; 21 lower jaw supporting component; 22 occipital bone supporting component; 23 rear side cervical vertebra supporting part; 24 cervico-thoracic vertebra rear side supporting sheet; 25. rear side supporting bar; 26. lumbar vertebra rear side supporting sheet; 27 cervico-thoracic vertebra front side supporting sheet; 28 front side supporting bar; 29 lumbar vertebra front side supporting sheet; 31. first threaded connector; 32 universal joint; 33 second threaded connector; 34 shaft sleeve; 35 spherical joint rotating hinge; 36 threaded hole; 121 pressure sensor; 122 first U-shaped connector; 123. shoulder push rod motor shell; 142 second U-shaped connector; 143 cervico-thoracic vertebra push rod motor shell; 411. neck collar connecting band; 412 first hook-and-loop; 421 shoulder connecting band; 422 second hook-and-loop; 431 fixing band; 432 third hook-and-loop; 441 lumbar vertebra connecting band; 442 fourth hook-and-loop.

DETAILED DESCRIPTION OF THE PREFERRED EMBODIMENTS

Hereinafter, a number of preferred embodiments of the invention will be introduced with reference to the drawings in the specification to make the technical content clearer and easier to understand. The invention can be embodied by many different forms of embodiments, and the protection scope of the invention is not limited to the embodiments mentioned in the text.

In the drawings, parts with the same structure are represented by the same numerals, and components with similar structures or functions are represented by similar numerals. The size and thickness of each component shown in the drawings are arbitrarily shown; and the invention does not limit the size and thickness of each component. In order to make the illustration clearer, the thickness of the parts is appropriately exaggerated in some places in the drawings.

As shown in FIG. 1 to FIG. 4, a wearable multifunctional powered exoskeleton for cervical vertebra rehabilitation comprises an active drive motor module 1, a fixed supporting module 2 and a movable joint component; the active drive motor module 1 is connected to the fixed supporting module 2, and comprises a left shoulder push rod motor 12, a right shoulder push rod motor 15, a cervico-thoracic vertebra left front side push rod motor 11, a cervico-thoracic vertebra left rear side push rod motor 13, a cervico-thoracic vertebra right front side push rod motor 14, and a cervico-thoracic vertebra right rear side push rod motor 16; and the active drive motor module 1 and the movable joint component 3 are combined to jointly form a six-connecting rod power-driven structure. The fixed supporting module 2 comprises a lower jaw supporting component 21, an occipital bone supporting component 22, a rear side cervical vertebra supporting part 23, a cervico-thoracic vertebra front side supporting sheet 27, and a cervico-thoracic vertebra rear side supporting sheet 24. The movable joint component 3 comprises a universal joints 32, and spherical joint rotating hinges 35.

Figure 5:
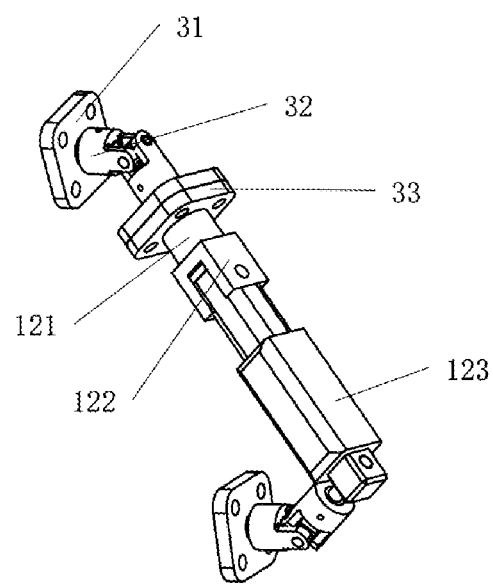
FIG. 5 is a structure diagram of shoulder push rod motors of the invention.
Figure 6:
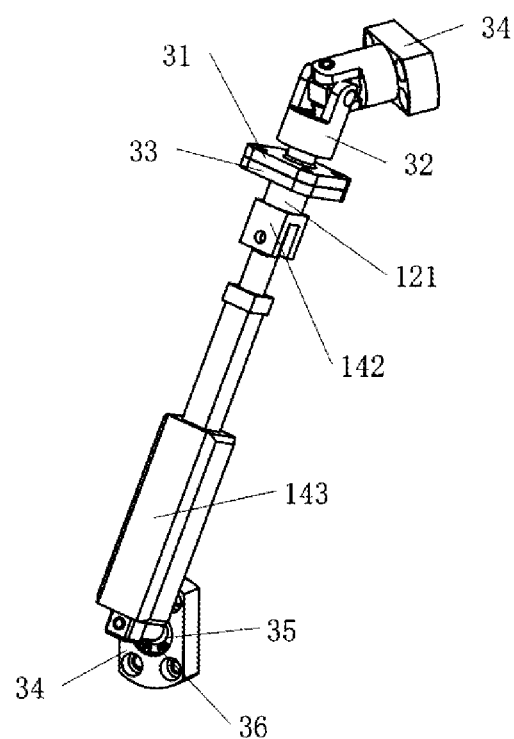
FIG. 6 is a structure diagram of cervico-thoracic vertebra push rod motors of the invention.

As shown in FIG. 5 to FIG. 6, the upper ends of the cervico-thoracic vertebra left front side push rod motor 11, the cervico-thoracic vertebra left rear side push rod motor 13, the cervico-thoracic vertebra right front side push rod motor 14, and the cervico-thoracic vertebra right rear side push rod motor 16 are in threaded connection with the lower jaw supporting component 21 or the occipital bone supporting component 22 through the universal joints 32; the lower ends of the cervico-thoracic vertebra left front side push rod motor 11, the cervico-thoracic vertebra left rear side push rod motor 13, the cervico-thoracic vertebra right front side push rod motor 14, and the cervico-thoracic vertebra right rear side push rod motor 16 are in threaded connection with the cervico-thoracic vertebra front side supporting sheet 27 or the cervico-thoracic vertebra rear side supporting sheet 24 through the spherical joint rotating hinges 35; the upper ends of the left shoulder push rod motor 12 and the right shoulder push rod motor 15 are in threaded connection with the lower jaw supporting component 21 through the universal joints 32; and the lower ends of the left shoulder push rod motor 12 and the right shoulder push rod motor 15 are in threaded connection with the cervico-thoracic vertebra rear side supporting sheet 24 through the universal joints 32.

In the active drive motor module 1, shoulder push rod motor shells 123 are arranged on the outsides of the left shoulder push rod motor 12 and the right shoulder push rod motor 15; cervico-thoracic vertebra push rod motor shells 143 are arranged on the outsides of the cervico-thoracic vertebra left front side push rod motor 11, the cervico-thoracic vertebra left rear side push rod motor 13, the cervico-thoracic vertebra right front side push rod motor 14, and the cervico-thoracic vertebra right rear side push rod motor 16; the wearable multifunctional powered exoskeleton for cervical vertebra rehabilitation is also provided with pressure sensors 121; the pressure sensors 121 are connected to the push rod motors through second threaded connectors 33; and first threaded connectors are connected to the universal joints 32. The pressure sensors 121 can simultaneously perform real-time control on the extending strokes of the push rod motors, and performs rehabilitation evaluation of the measured torque; and the coordinated movement of the different extending strokes of the push rod motors realizes the passive traction, antiflexion and retroextension, lateral flexion and horizontal rotation rehabilitation exercises of the cervical vertebra.

The occipital bone supporting component 22 of the fixed supporting module 2 is in threaded connection with a rear side cervical vertebra supporting part 23; when the antiflexion and retroextension, lateral flexion and horizontal rotation rehabilitation exercises of the cervical vertebra are performed, the rear side cervical vertebra supporting part 23 is dismantled, and an angle transducer 221 is arranged at the middle position of the occipital bone supporting component 22; the angle transducer 221 can accurately measure the rehabilitation exercise angle of the cervical vertebra; and shoulder connecting bands 421 and second hook-and-loops 422 are arranged on the shoulders of the cervico-thoracic vertebra front side supporting sheet 27 and the cervico-thoracic vertebra rear side supporting sheet 24, and are designed to be of different models to achieve individual adaptation.

Figure 7:
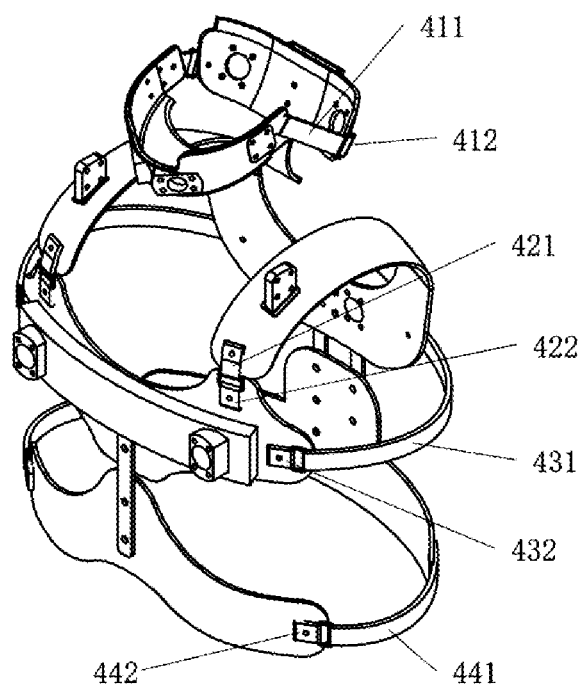
FIG. 7 is a structure diagram of a magic tap supporting device of the powered exoskeleton of the invention.

As shown in FIG. 7, the cervico-thoracic vertebra front side supporting sheet 27 is connected to a lumbar vertebra front side supporting sheet 29 through a front side supporting bar 28; the cervico-thoracic vertebra rear side supporting sheet 24 is connected to a lumbar vertebra rear side supporting sheet 26 through a rear side supporting bar 25; and the lengths of the front side supporting bar 28 and the rear side supporting bar 25 can be adjusted in the height direction. A neck collar connecting band 411 is arranged between the lower jaw supporting component 21 and the occipital bone supporting component 22 for connection; a lumbar vertebra connecting band 441 is arranged between the lumbar vertebra front side supporting sheet 29 and the lumbar vertebra rear side supporting sheet 26; the lengths of the neck collar connecting band 411 and the lumbar vertebra connecting band 441 can be adjusted; and the lower jaw and the lower edge of the cervical vertebra are also provided with a first hook-and-loop 412 and a fourth hook-and-loop 442. Supporting bars 4 are also arranged at the axilla positions of the cervico-thoracic vertebra front side supporting sheet 27 and the cervico-thoracic vertebra rear side supporting sheet 24; the supporting bars 4 comprise fixing bands 431 and third hook-and-loops 432; and the lengths of the supporting bars 4 can also be adjusted.

The using steps of the embodiment are as follows:

The push rod motors constitute a parallel six-rod power driven mechanism. The passive traction movement of the cervical vertebra is realized through the simultaneous and same extending stroke of six rods; the six-rod power driven mechanism realizes the lateral bending resistance exercise of the cervical vertebra through the cooperation of the extending stroke/return stroke of the cervico-thoracic vertebra left front side push rod motor 11, the cervico-thoracic vertebra left rear side push rod motor 13 and the left shoulder push rod motor 12 and the return stroke/extending stroke of the cervico-thoracic vertebra right front side push rod motor 14, the cervico-thoracic vertebra right rear side push rod motor 16 and the right shoulder push rod motor 15; the six-rod power driven mechanism realizes the anteflexion/retroextension resistance exercise of the cervical vertebra through the cooperation of the return stroke/extending stroke of the cervico-thoracic vertebra left front side push rod motor 11, the cervico-thoracic vertebra right front side push rod motor 14, the left shoulder push rod motor 12 and the right shoulder push rod motor 15 and the extending stroke/return stroke of the cervico-thoracic vertebra left rear side push rod motor 13 and the cervico-thoracic vertebra right rear side push rod motor 16; and the six-rod power driven mechanism realizes the horizontal rotation resistance exercise of the cervical vertebra through the unchanged process of the cervico-thoracic vertebra left front side push rod motor 11, the cervico-thoracic vertebra right front side push rod motor 14, the cervico-thoracic vertebra left rear side push rod motor 13 and the cervico-thoracic vertebra right rear side push rod motor 16 and the return stroke/extending stroke of the left shoulder push rod motor 12 and the right shoulder push rod motor 15.

Compared with the prior art, the wearable multifunctional powered exoskeleton for cervical vertebra rehabilitation takes into account cervical vertebra enhancement and rehabilitation training, can realize the passive traction, anteflexion and retroextension, lateral flexion and horizontal rotation four-degree-of-freedom rehabilitation exercises of the cervical vertebra through the six-rod power driven mechanism, performs the traction training of a neck, realizes the directional resistance training of neck muscles, improves the muscle force of the neck, enhances the stability of the cervical vertebra, improves and corrects the biomechanical balance of the cervical vertebra. The wearable multifunctional powered exoskeleton for cervical vertebra rehabilitation strengthens the active muscle force of the cervical vertebra through resistance training, and is of great significance for promoting the health of the cervical vertebra and improving the working ability of people with high incidence of cervical spondylosis.

The preferred specific embodiments of the invention are described in detail above. It should be understood that many modifications and changes of ordinary technologies in the field can be made according to the concept of the invention without creative work. Therefore, all technical solutions that can be obtained by those skilled in the art through logical analysis, reasoning or limited experiments on the basis of the concept of the invention based on the prior art should fall within the protection scope determined by the claims.

The invention claimed is:

1. A wearable multifunctional powered exoskeleton for cervical vertebra rehabilitation, comprising an active drive motor module, a fixed supporting module and a movable joint component; the active drive motor module is connected to the fixed supporting module, and comprises a left shoulder push rod motor, a right shoulder push rod motor, a cervico-thoracic vertebra left front side push rod motor, a cervico-thoracic vertebra left rear side push rod motor, a cervico-thoracic vertebra right front side push rod motor, and a cervico-thoracic vertebra right rear side push rod motor; and the active drive motor module and the movable joint component are combined to jointly form a six-connecting rod power-driven structure; wherein the fixed supporting module comprises a lower jaw supporting component, an occipital bone supporting component, a rear side cervical vertebra supporting part, a cervico-thoracic vertebra front side supporting sheet, and a cervico-thoracic vertebra rear side supporting sheet; wherein the movable joint component comprises universal joints and spherical joint rotating hinges; wherein the occipital bone supporting component is in threaded connection with the rear side cervical vertebra supporting part; and when antiflexion and retroextension, lateral flexion and horizontal rotation rehabilitation exercises of the cervical vertebra are performed, the rear side cervical vertebra supporting part is dismantled, and an angle transducer is arranged at a middle position of the occipital bone supporting component.

2. A wearable multifunctional powered exoskeleton for cervical vertebra rehabilitation, comprising an active drive motor module, a fixed supporting module and a movable joint component; the active drive motor module is connected to the fixed supporting module, and comprises a left shoulder push rod motor, a right shoulder push rod motor, a cervico-thoracic vertebra left front side push rod motor, a cervico-thoracic vertebra left rear side push rod motor, a cervico-thoracic vertebra right front side push rod motor, and a cervico-thoracic vertebra right rear side push rod motor; and the active drive motor module and the movable joint component are combined to jointly form a six-connecting rod power-driven structure; wherein the fixed supporting module comprises a lower jaw supporting component, an occipital bone supporting component, a rear side cervical vertebra supporting part, a cervico-thoracic vertebra front side supporting sheet, and a cervico-thoracic vertebra rear side supporting sheet; wherein the movable joint component comprises universal joints and spherical joint rotating hinges; wherein upper ends of the cervico-thoracic vertebra left front side push rod motor, the cervico-thoracic vertebra left rear side push rod motor, the cervico-thoracic vertebra right front side push rod motor, and the cervico-thoracic vertebra right rear side push rod motor are in threaded connection with the lower jaw supporting component or the occipital bone supporting component through the universal joints; lower ends of the cervico-thoracic vertebra left front side push rod motor, the cervico-thoracic vertebra left rear side push rod motor, the cervico-thoracic vertebra right front side push rod motor, and the cervico-thoracic vertebra right rear side push rod motor are in threaded connection with the cervico-thoracic vertebra front side supporting sheet or the cervico-thoracic vertebra rear side supporting sheet through the spherical joint rotating hinges; the upper ends of the left shoulder push rod motor and the right shoulder push rod motor are in threaded connection with the lower jaw supporting component through the universal joints; and the lower ends of the left shoulder push rod motor and the right shoulder push rod motor are in threaded connection with the cervico-thoracic vertebra rear side supporting sheet through the universal joints; wherein the wearable multifunctional powered exoskeleton is also provided with pressure sensors; the pressure sensors are connected to the push rod motors through threaded connectors; and the other end of the threaded connectors are connected to the universal joints; wherein the universal joints are connected to the fixed supporting module through shaft sleeves; and the spherical joint rotating hinge is connected to the cervico-thoracic vertebra front side supporting sheet or the cervico-thoracic vertebra rear side supporting sheet through the shaft sleeve; wherein the cervico-thoracic vertebra front side supporting sheet is connected to a lumbar vertebra front side supporting sheet through a front side supporting bar; the cervico-thoracic vertebra rear side supporting sheet is connected to a lumbar vertebra rear side supporting sheet through a rear side supporting bar; and lengths of the front side supporting bar and the rear side supporting bar is adjustable in a height direction; wherein the lower jaw supporting component and the occipital bone supporting component are connected through a neck collar connecting band and a first hook-and-loop; and the cervico-thoracic vertebra front side supporting sheet and the cervico-thoracic vertebra rear side supporting sheet are connected through shoulder connecting bands and second hook-and-loop.

3. A wearable multifunctional powered exoskeleton for cervical vertebra rehabilitation, comprising an active drive motor module, a fixed supporting module and a movable joint component; the active drive motor module is connected to the fixed supporting module, and comprises a left shoulder push rod motor, a right shoulder push rod motor, a cervico-thoracic vertebra left front side push rod motor, a cervico-thoracic vertebra left rear side push rod motor, a cervico-thoracic vertebra right front side push rod motor, and a cervico-thoracic vertebra right rear side push rod motor; and the active drive motor module and the movable joint component are combined to jointly form a six-connecting rod power-driven structure; wherein the fixed supporting module comprises a lower jaw supporting component, an occipital bone supporting component, a rear side cervical vertebra supporting part, a cervico-thoracic vertebra front side supporting sheet, and a cervico-thoracic vertebra rear side supporting sheet; wherein the movable joint component comprises universal joints and spherical joint rotating hinges; wherein upper ends of the cervico-thoracic vertebra left front side push rod motor, the cervico-thoracic vertebra left rear side push rod motor, the cervico-thoracic vertebra right front side push rod motor, and the cervico-thoracic vertebra right rear side push rod motor are in threaded connection with the lower jaw supporting component or the occipital bone supporting component through the universal joints; lower ends of the cervico-thoracic vertebra left front side push rod motor, the cervico-thoracic vertebra left rear side push rod motor, the cervico-thoracic vertebra right front side push rod motor, and the cervico-thoracic vertebra right rear side push rod motor are in threaded connection with the cervico-thoracic vertebra front side supporting sheet or the cervico-thoracic vertebra rear side supporting sheet through the spherical joint rotating hinges; the upper ends of the left shoulder push rod motor and the right shoulder push rod motor are in threaded connection with the lower jaw supporting component through the universal joints; and the lower ends of the left shoulder push rod motor and the right shoulder push rod motor are in threaded connection with the cervico-thoracic vertebra rear side supporting sheet through the universal joints; wherein the wearable multifunctional powered exoskeleton is also provided with pressure sensors; the pressure sensors are connected to the push rod motors through threaded connectors; and the other end of the threaded connectors are connected to the universal joints; wherein the universal joints are connected to the fixed supporting module through shaft sleeves; and the spherical joint rotating hinge is connected to the cervico-thoracic vertebra front side supporting sheet or the cervico-thoracic vertebra rear side supporting sheet through the shaft sleeve; wherein the cervico-thoracic vertebra front side supporting sheet is connected to a lumbar vertebra front side supporting sheet through a front side supporting bar; the cervico-thoracic vertebra rear side supporting sheet is connected to a lumbar vertebra rear side supporting sheet through a rear side supporting bar; and lengths of the front side supporting bar and the rear side supporting bar is adjustable in a height direction; wherein supporting bars are also arranged at the axilla positions of the cervico-thoracic vertebra front side supporting sheet and the cervico-thoracic vertebra rear side supporting sheet; the lengths of the supporting bars can be adjusted; the supporting bar comprises a fixing band and a third hook-and-loop; and the lumbar vertebra front side supporting sheet and the lumbar vertebra rear side supporting sheet are connected through a lumbar vertebra connecting band and a fourth hook-and-loop.

* * * * *